No. 635,436. Patented Oct. 24, 1899.
L. FRITZ.
MACHINE FOR PULVERIZING COFFEE, &c.
(Application filed Dec. 19, 1898.)
(No Model.)
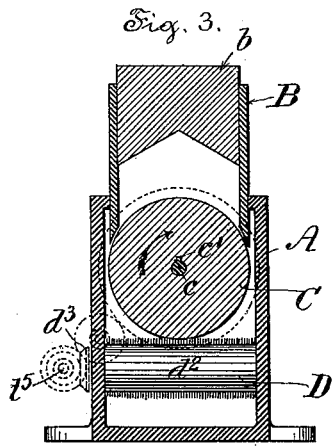
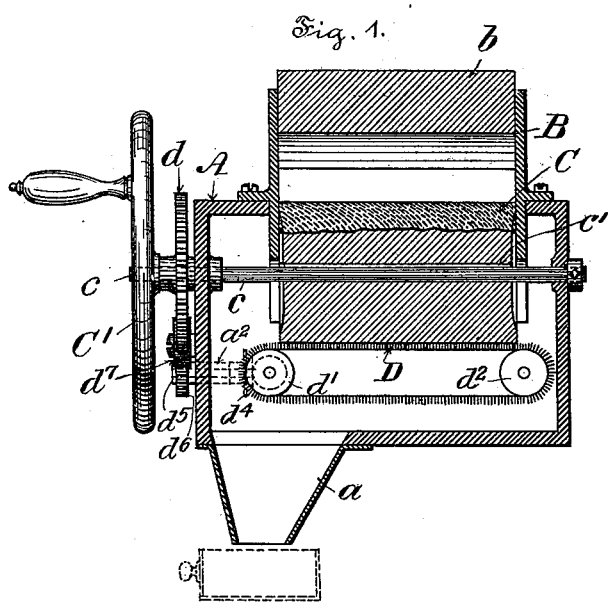
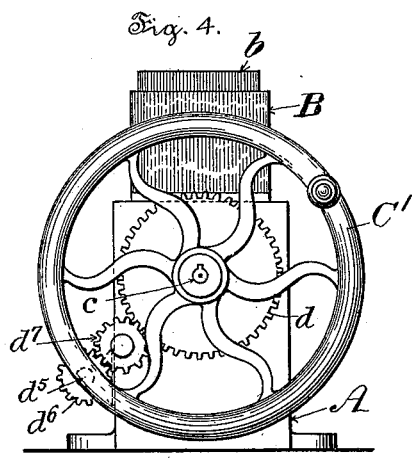
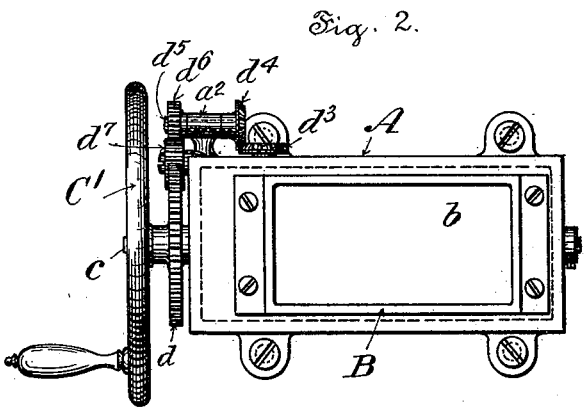
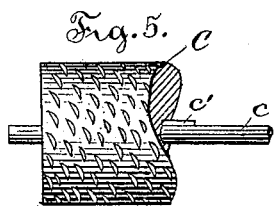
Witnesses:
Hermann W. Bormann
Fredrick Bowsch
Inventor:
Louis Fritz
By Hermann Bormann
Att'y.

UNITED STATES PATENT OFFICE.

LOUIS FRITZ, OF PHILADELPHIA, PENNSYLVANIA, ASSIGNOR TO GEORGE D. NUBER, OF SAME PLACE.

MACHINE FOR PULVERIZING COFFEE, &c.

SPECIFICATION forming part of Letters Patent No. 635,436, dated October 24, 1899.

Application filed December 19, 1898. Serial No. 699,764. (No model.)

*To all whom it may concern:*

Be it known that I, LOUIS FRITZ, a citizen of the United States, residing at Philadelphia, in the county of Philadelphia and State of Pennsylvania, have invented a new and useful Machine for Pulverizing Coffee, &c., of which the following is a specification.

My invention relates to improvements in machines for pulverizing coffee, in which a rotary cutting or filing roll operates to cut, file, or shave from a supply of coffee or other material resting on or being pressed against said roll; and the objects of my improvements are, first, to provide a continuously-driven steel or other brush to clean the rotating cutting or filing roll of the pulverized coffee and convey the same to a discharge-spout; second, to provide mechanism for driving the said brush simultaneously with the said roll, so that no clogging of the pulverized coffee in the teeth or between the walls and roll is possible. I attain these objects by the mechanism illustrated in the accompanying drawings, in which—

Figure 1 is a vertical longitudinal section of the entire machine. Fig. 2 is a top view of the machine; Fig. 3, a vertical transverse section; Fig. 4, a front elevation of the machine. Fig. 5 is a front view of a portion of the abrading-roll.

Referring now to the drawings for a further description of my invention, A is a casing cast or made in any suitable manner, with a spout $a$ in the bottom and an opening at the top. A rectangular hopper B is removably secured to the top of the casing A and contains the object to be pulverized and means, as a weight $b$ or its equivalent, for pressing the coffee or other material downward.

C is a roll held to the main shaft $c$ by a key $c'$ for filing away—that is, pulverizing—from the supply of coffee or other material held in contact therewith, and thereby pulverizing the same. This roll is cut on its peripheral surface like a file or rasp, whose teeth run in a spiral direction, and at its upper half it is entirely surrounded by the hopper B, fitting with its longitudinal edges close onto the surface of the roll to prevent any chips or pieces of coffee or other material to fall through. The shaft $c$ is provided with a hand-wheel or fly-wheel $C'$ for rotating the roll C, and with a gear-wheel $d$ to drive the traveling steel or other brush D, mounted on the rollers $d'$ and $d^2$, journaled in the sides of the casing A. On the shaft of the roller $d'$ is secured a bevel gear-wheel $d^3$, meshing with a similar wheel $d^4$ on the shaft $d^5$, journaled in the lug $a^2$ of the casing A. A gear-wheel $d^6$ on the shaft $d^5$ meshes with an idle wheel $d^7$, and this is driven from the main shaft $c$ by the gear-wheel $d$. The proportion of the various wheels—that is, the speed of the roll C and brush D—is such that the brush is capable of keeping the teeth of the cutting or filing roll clean and of forwarding all the ground-off material to the discharge-spout.

The teeth on the cutting or filing roll C may be coarse or fine to either granulate or pulverize the material and may be cut in any manner and shape. Further, the weight $b$ may be substituted by a lid with spring or other pressure, as will be readily understood by those skilled in the art.

Having thus described the nature and objects of my invention, what I claim as new, and desire to secure by Letters Patent, is—

1. A pulverizing-machine comprising a casing for a cutting-roll, a cutting-roll journaled therein, a hopper surrounding said roll, a longitudinally-traveling brush located under the said roll and adapted to maintain the teeth of the cutting-roll clean, and also adapted to receive the ground material and carry it to the delivery-spout, substantially as and for the purposes set forth.

2. In a pulverizing-machine a rotary cutting-roll, a brush longitudinally traveling underneath the said roll and in contact therewith, and adapted to receive the ground material and carry it to the delivery-spout, said brush mounted on two rollers, one of which is driven from the shaft of the said rotary cutting-roll, substantially as and for the purposes set forth.

3. A pulverizing-machine comprising a casing with a discharge-spout, a cutting-roll driven by a wheel, a hopper surrounding said roll, a brush in contact with said roll and traveling along and underneath the same, and adapted to carry the ground material to the delivery-spout, and means connected with the said wheel to propel the said brush, substantially as and for the purposes set forth.

In witness whereof I have hereunto set my hand in the presence of two subscribing witnesses.

LOUIS FRITZ.

Witnesses:
GEO. D. NUBER,
EMMA M. NUBER.